Sept. 12, 1967 A. WHITTELL, JR 3,341,122
INTEGRATED HYDRONIC HEATING SYSTEM
Filed March 30, 1965 2 Sheets-Sheet 2

INVENTOR.
ALFRED WHITTELL, JR.
BY Lyon & Lyon
ATTORNEYS

United States Patent Office 3,341,122
Patented Sept. 12, 1967

3,341,122
INTEGRATED HYDRONIC HEATING SYSTEM
Alfred Whittell, Jr., Los Angeles, Calif., assignor to Raypak Company, Inc., El Monte, Calif., a corporation of California
Filed Mar. 30, 1965, Ser. No. 443,904
6 Claims. (Cl. 237—8)

The present invention relates generally to an improved heating system and particularly to a hot water system which can provide hot water for domestic use as well as for indirect space and area heating. More specifically, the present invention provides a combined space heating and domestic water heating system in which the functions of air separation and elimination, water expansion, and domestic water heating are performed in a single vessel.

Central heating systems employing hot water circulating through a network of pipes have been used for many years for room space heating, snow melting, indirect swimming pool heating or other similar purposes. Such systems are now generically referred to as hydronic heating systems. The necessary equipment to perform such a heating operation has required installation of separate systems including boilers, expansion tanks, air eliminators, etc., resulting in a substantial multiplication of parts over and above those used for domestic water heating or swimming pool heating.

For example, in a dwelling such as a motel or apartment, domestic hot water has been provided by conventional water heaters. If a swimming pool is present, the heat for the water is ordinarily provided by use of a direct-heating circulation system completely separate from the domestic supply. If hydronic heating is employed, a third independent system is required with separate boilers, pumps, etc. In some installations, hydronic heating of both room space and pool has been done by use of apparatus circulating hot water in the room networks as well as networks of pipes under the pool. Even in the latter installations, the domestic supply must be separate.

A hydronic system must be closed and dead, and air-free water is ideal for optimum heating efficiency. This water does not leave the system and only make-up water need be added. With air eliminated from the system water, the pressure of expansion of the water upon heating must be alleviated to prevent bursting of the pipes. An expansion tank is normally used for this purpose. Thus, this system cannot be connected for domestic use as the latter requires an open system from which water is continually added and withdrawn. Furthermore, dead, air-free water is undesirable for domestic purposes.

It is an object therefore, of the present invention to provide an integrated heating system for hydronic as well as domestic water heating purposes.

It is a further object of this invention to provide a combined hydronic and domestic water heating system requiring a single boiler.

It is another object of the invention to provide an integrated heating system employing a novel combination indirect water heating and air expansion tank.

Another object of the invention is to provide a combined domestic and hydronic heating system wherein the hydronic system is continuously recirculated through part of the system, thus maintaining a supply of domestic hot water, even though hydronic heating is not continuously needed for space heating.

It is a more specific object of the present invention to provide an integrated heating system employing a unique combination expansion and indirect water heating tank which also separates entrapped air from the water and automatically eliminates the excess air.

Further objects and advantages will become apparent upon reading the following description in conjunction with the attached drawings, in which.

Figure 1:
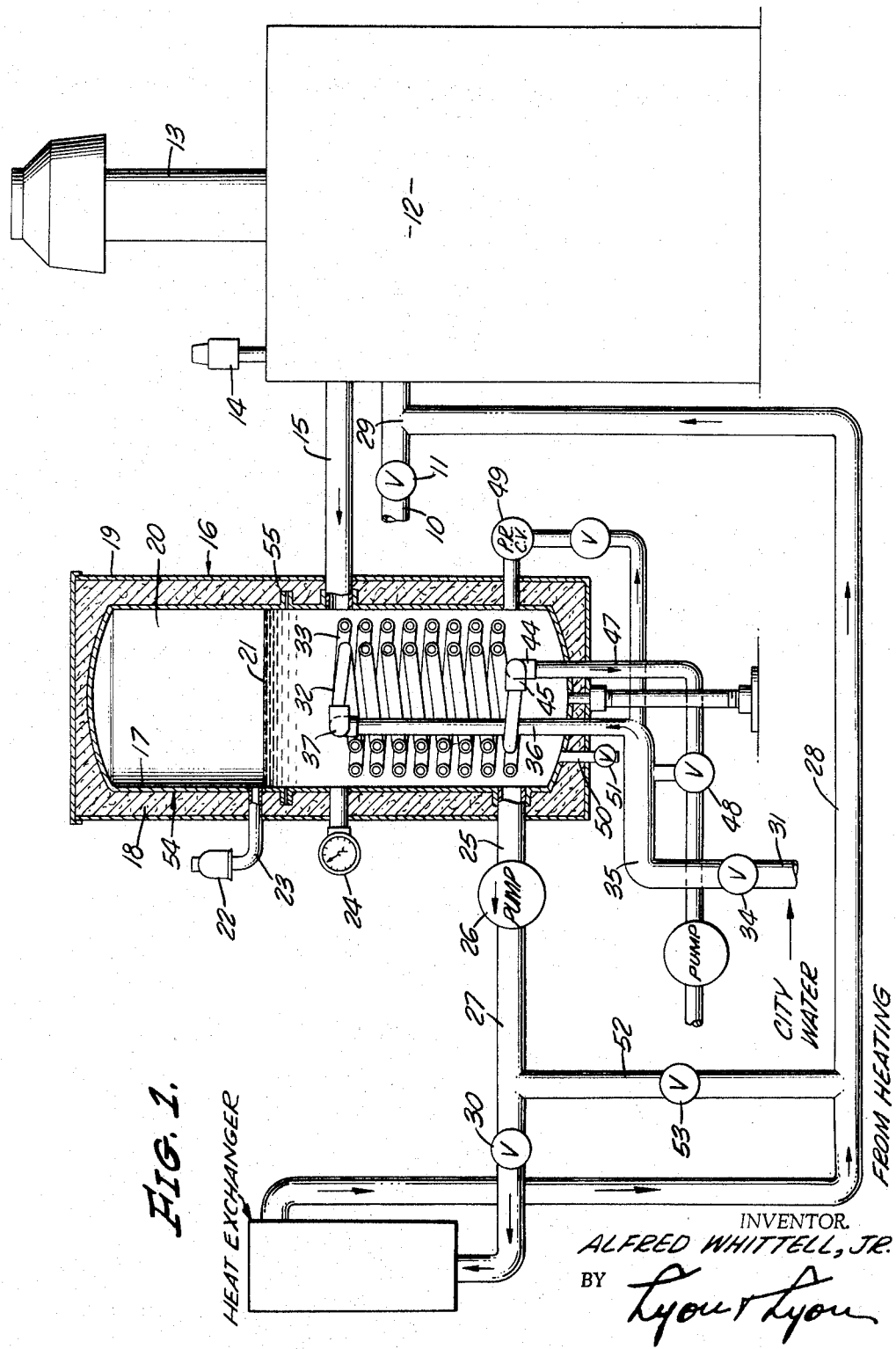
FIGURE 1 is a diagrammatic elevational view of the heating system of the present invention.

Referring now to FIGURE 1, fresh city water enters the system at inlet pipe 10. Inlet valve 11 controls the introduction of fresh water into the hydronic system and after initial filling, valve 11 would normally be closed except for periodic additions to compensate for leaks or evaporation, if any. After passing valve 11, water enters the boiler 12 which is of ordinary design, usually gas-fired, with an exhaust flue 13 and relief valve 14.

Hot water leaves boiler 12 through pipe 15 and enters the air separation tank 16. Tank 16 is a vertical, cylindrical vessel having inner walls 17 surrounded by insulating material 18 such as fiberglass or the like, and outer cylindrical housing 19. Pipe 15 enters tank 16 at a point about half-way from the bottom. Water which has been heated in the boiler will liberate dissolved air upon entering tank 16 which will expand into the upper area 20 of tank 16. This area 20 is maintained for air expansion and under normal system static pressures, tank 16 will be about two-thirds full of water.

The separation of air from the hot water eliminates the necessity for other air trapping means. If air is not eliminated at all, it will find its way to high points in the heating system pipes where it will remain, interfering with smooth hydraulic flow. Furthermore, air locks may result which completely block flow. In any case, air in the system adversely affects heat transfer.

Whenever an excessive amount of air has collected in area 20, the pressure then created will force the water level 21 downward. An air vent 22 is located on tank 16 with an outlet pipe 23 extending through inner wall 17 into area 20. Excess air will be exhausted through vent 22 when water level 21 drops below pipe 23. The result is that the air in solution is separated from the water and placed in the cushion area 20, except excess air which is automatically evacuated. Dead, air-free hot water is thus obtained. A temperature and pressure gauge 24 may be installed upon tank 16 to provide a check on boiler heating and to assure proper elimination of excess air.

Hot water is extracted from tank 16 through outlet pipe 25 near the bottom of the tank, connected to the pump 26. Pump 26 maintains circulation of the hot water from tank 16 through pipeline 27, which may extend to various configurations of banks or heating coils for rooms, swimming pools, sidewalks, etc., returning through pipeline 28 which joins inlet pipe 10 at 29 and re-enters boiler 12, thereafter returning to tank 16 again. A valve 30 is provided in pipeline 27 to control flow therein and such valve is thermostatically operated to control the amount of heat delivered. It is understood that a multitude of additional pipelines and zone valves may connect to pipeline 27 to provide various types of heating systems for different purposes.

In the lower half of tank 16, there is mounted a double set of concentrically wound coils 32 and 33 through which water to be heated for domestic use, i.e., drinking, cooking, or for pool heating or snow melting, is circulated. Hot water entering the tank from pipe 15 flows over the top of these coils and down through the entire section, which slows up or baffles the flow. This allows further time for air to be separated from the water. During this flow, heat is transferred directly to the coils 32 and 33 from the boiler-heated water.

Figure 2:
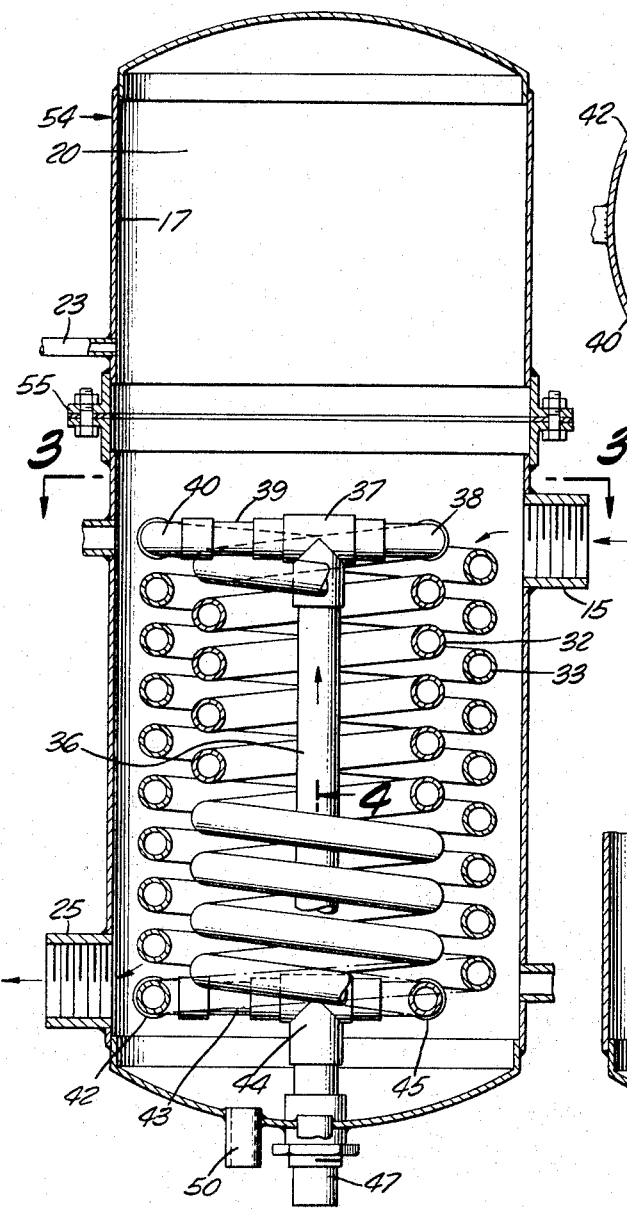
FIGURE 2 is a partially sectional side elevation of the separation and heating tank.
Figure 3:
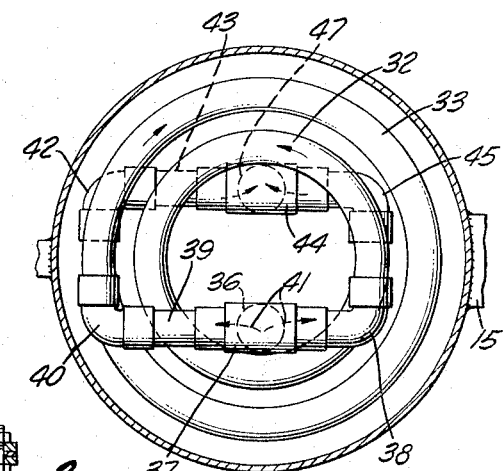
FIGURE 3 is a top sectional view of the tank taken along line 3—3 of FIGURE 2.

Fresh water enters the domestic water system from inlet pipe 31, through valve 34 and conduit 35. A vertical stand pipe 36 connects to conduit 35 and extends upwardly into the interior of tank 16, supporting the coils 32 and 33 therein. A T-joint 37 is connected to the upper end of stand pipe 36 as may best be seen in FIGURES 2 and 3. By means of an elbow 38, one side of T 37 connects to the inner coil 32. By means of a short nipple 39 and an elbow 40, the other side of T 37 is connected to outer coil 33. Thus, water entering through stand pipe 36 travels up to the top and, as shown by arrows 41 in FIGURE 3, is distributed to the top of coils 32 and 33 whereupon it will flow down to the bottoms.

Figure 4:
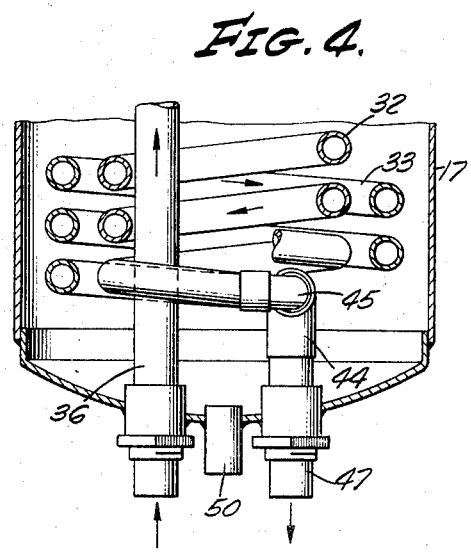
FIGURE 4 is a fragmentary side view, partially in section, of the heater coil taken along line 4—4 of FIGURE 2.

The bottom end of coil 33 is connected to elbow 42, nipple 43 and thence to T-joint 44. The bottom end of coil 32 is connected to elbow 45 and then to T-joint 44, whereby, water descending in the two coils is reunited at T-joint 44, as shown by arrows 36 in FIGURE 3; whereupon it will flow out pipe 47. For clarity of illustration, FIGURE 3 shows the bottom outlet connections in dotted lines, but they are also seen in FIGURES 3 and 4 in full lines.

Water thus heated in coils 32, 33 is available for domestic use by connection to pipe 47. To maintain a more uniform temperature, particularly where high boiler temperatures are employed or where only infrequent use is made of domestic hot water, a mixing valve 48 may be inserted in pipe 47 and connected to inlet conduit 36 to meter a quantity of cold water into the hot water line 47. Mixing valve 48 is thermostatically operated so that water which has been standing in the coils 32, 33 for some time and thus has become quite hot, will be mixed with a relatively large proportion of cold water. After the water has run continuously in pipe 47 for some time, it becomes cooler, whereupon valve 48 will decrease the amount of cold water being added.

A pressure regulating check valve 49 is connected to conduit 35 and to the interior of tank 16. Valve 49 is provided to automatically add make-up water to the system water from the external city water supply. When pressure in the heating system inside tank 16 falls below the regulator setting, usually about 10 to 12 p.s.i.g., valve 49 will open to allow make-up water to enter tank 16. Valve 49 is of the ball-check type to assure that none of the system water backs up into the domestic supply. A drain bib 50 and stopcock 51 are provided on tank 16 for drainage.

Even though hydronic heating may not, from time to time, be required, domestic water heating must always be available. Accordingly, a branch line 52 is attached to pipeline 27 downstream from the pump 26 and connects to return pipeline 28 through a balancing valve 53. Pump 26 will be run continuously, thus performing two jobs— space heating and domestic hot water are simultaneously provided, or only domestic hot water when space heat is not needed. The boiler 12 will be turned on and off either by the heating thermostat or the domestic hot water thermostat, both of which are wired in parallel to the electric gas valve on the boiler.

The drawings show a double set of concentrically wound coils 32 and 33 mounted inside tank 16 as a preferred embodiment. It will be understood that for different system capacities and applications, the size and perhaps also the number of such coils will vary. For larger coil sizes, a larger tank 16 will be required and the top portion 54 is provided in various sizes and is adapted to be attached to the lower half as shown at 55. In addition, the coils inside the tank may be separately connected to different external systems. For example, coils 32 and 33 may be separated or a third coil added. This can then provide domestic water heating as well as indirect sidewalk heating or direct swimming pool water heating as an alternative to the indirect pool heating accomplished by connection to the hydronic system. In this instance, an additional circulating pump similar to pump 26 may be required unless a pool filter pump or the like will be sufficient.

While what has been described is a preferred embodiment of the present invention, changes and modifications will be apparent to those skilled in the art and it is the aim of the appended claims to cover all such changes and modifications as fall within the true scope and spirit of this invention.

I claim:

1. A closed hydronic water heating system including, heat exchanging means;
    means for heating water in said system;
    means connected to said heating means for storing said heated water and permitting the separation of entrapped air therefrom;
    means connected to said storage means for exhausting separated air from said storage means;
    pump means connected to said storage means for continuously circulating said water through said storage means;
    thermostatically controlled valve means for selectively regulating flow of heated water from said pump means through said heat exchanger means and back to said heating means; and
    valve regulated means bypassing said heat exchanging means and said controlled valve means for enabling the continued circulation of water through said storage means when flow through said heat exchanger means is reduced.

2. An integrated hydronic and domestic water heating system, said hydronic system comprising,
    a closed system including heat exchanger means;
    means for heating water in said system;
    means for storing said heated water and permitting the separation of entrapped air therefrom;
    means for exhausting separated air from said storage means;
    means continuously circulating said water through said storage means;
    thermostatically controlled valve means for selectively regulating flow of heated water through said heat exchanger means; and
    valve regulated bypass means enabling the continued circulation of water through said storage means when flow through said heat exchanger means is reduced; and
    said domestic water system comprising an open system, including,
    a heating element positioned within said storage means, having a cold water inlet and a hot water outlet adapted for connection to an external water system;
    means for metering water from said cold water inlet into said hot water outlet;
    sensing means responsive to pressure in said closed system; and
    means controlled by said sensing means for communicating make-up water from said cold water inlet to said storage means.

3. A water heating system as described in claim 2 wherein said domestic water system further comprises a second closed system, including,
    a second heating element positioned within said storage means, adapted for connection to an external water system; and
    second pump means for selectively circulating water through said second closed system.

4. An integrated heating system comprising,
    a boiler for heating water, having a cold water inlet connected to an external source of water, and a hot water outlet;
    said hot water outlet connected to a tank adapted to permit the separation of entrapped air from said hot water as said water enters said tank;

means attached to said tank for permitting excess separated air to escape from said tank;
a continuously operated pump, said pump having an intake attached to said tank and an outlet connected through a pipeline to a heat exchanger means;
a return line connected from said heat exchanger means to said boiler inlet;
a branch line having one end connected to said pipeline down stream from said pump and having a second end connected to said return line;
thermostatically controlled valve means in said pipeline and said branch line for controlling recycling of hot water through said branch line to said tank when said water is not required in said heat exchanger means;
a plurality of coils mounted within said tank, each said coil having one end connected to an external source of water and a second end adapted to be connected to a domestic water supply;
said coils positioned to be immersed in hot water in said tank.

5. An integrated heating system comprising,
a boiler for heating water having a cold water inlet connected to an external source of water, and a hot water outlet;
said hot water outlet connected to a tank adapted to permit the separation of entrapped air from said hot water as said water enters said tank;
means attached to said tank for permitting excess separated air to escape from said tank;
a continuously operated pump, said pump having an intake attached to said tank and an outlet connected through a pipeline to a heat exchanger means;
a return line from said heat exchanger means to said boiler inlet;
a branch line having one end connected to said pipeline down stream from said pump and having a second end connected to said return line;
thermostatically controlled valve means in said pipeline and said branch line for controlling recycling of hot water through said branch line to said tank when said water is not required in said heat exchanger means;
a plurality of coils mounted within said tank;
one of said coils having an end connected to an external source of water and another end extending outside said tank and adapted to be connected to a domestic water supply, a mixing valve positioned in the end of said coil connecting said outlet to said external source of water;
another of said coils having inlet and outlet ends adapted for connection to an external water system;
said plurality of coils positioned to be immersed in hot water in said tank.

6. An integrated system comprising,
a boiler for heating water having a cold water inlet connected to an external source of water, and a hot water outlet;
said hot water outlet connected to a tank adapted to permit the separation of entrapped air from said hot water as said water enters said tank;
means attached to said tank for permitting excess separated air to escape from said tank;
a continuously operated pump, said pump having an intake attached to said tank and an outlet connected through a pipeline to a heat exchanger means;
a return line connected from said heat exchanger means to said boiler inlet;
a branch line having one end connected to said pipeline down stream from said pump and having a second end connected to said return line;
thermostatically controlled valve means in said pipeline and said branch line for controlling recycling of hot water through said branch line to said tank when said water is not required in said heat exchanger means;
a plurality of coils mounted within said tank;
one of said coils having an inlet end connected to an external source of water and outlet end extending outside said tank and adapted to be connected to a domestic water supply;
a pipeline connected between the inlet end of said coil and said tank;
means including a check valve connected in said pipeline for adding make-up water to said tank;
other of said coils each having an inlet and an outlet end adapted to be connected to an external water system;
said plurality of coils positioned to be immersed in hot water in said tank.

References Cited
UNITED STATES PATENTS

| | | | |
|---|---|---|---|
| 1,353,844 | 9/1920 | O'Dell | 237—8 |
| 2,081,831 | 5/1937 | Moore | 237—19 X |
| 2,290,347 | 7/1942 | Moore et al. | 237—19 |
| 2,343,856 | 3/1944 | Tidd | 237—19 X |
| 2,781,174 | 2/1957 | Smith | 237—8 |
| 3,139,867 | 7/1964 | Cleaver et al | 122—406 |

EDWARD J. MICHAEL, *Primary Examiner.*